United States Patent [19]
Nelson

[11] 4,304,160
[45] Dec. 8, 1981

[54] NO RETURN MARK TOOL

[75] Inventor: Milford W. Nelson, Grayslake, Ill.

[73] Assignee: Barr-Don, Inc., Grayslake, Ill.

[21] Appl. No.: 121,832

[22] Filed: Feb. 15, 1980

[51] Int. Cl.³ .................... B23B 29/00; B26D 1/12
[52] U.S. Cl. .................................. 82/36 R; 407/8; 407/89
[58] Field of Search .............. 82/36 R; 407/8, 88, 407/89, 120

[56] References Cited

U.S. PATENT DOCUMENTS

| Re. 5,277 | 2/1873 | Ettenborough | 407/89 |
| 893,942 | 7/1908 | Sellew | 407/89 |
| 2,525,216 | 10/1950 | Garrand | 82/36 R |
| 3,283,394 | 11/1966 | Hargreaves | 407/89 |

OTHER PUBLICATIONS

Sales Brochures-No Return Mark Turning & Facing Tools of D. L. Nelson Mfg. Co., (Now Barr-Don Inc.) of Grayslake, Ill., 2 pp.

Primary Examiner—Harrison L. Hinson
Attorney, Agent, or Firm—Wegner, Stellman, McCord, Wood & Dalton

[57] ABSTRACT

A spring actuated, pivoting cutting tool, which is used in conjunction with turning equipment and which at the termination of its cutting stroke automatically lifts the cutting edge off the finished surface to allow the tool to be withdrawn without leaving a return mark, is provided with a spring actuated, slidable shield which substantially covers any gap between the moving parts of the cutting tool, thus reducing the likelihood of chips or other debris from lodging between the moving parts of the tool and preventing its proper operation.

8 Claims, 4 Drawing Figures

U.S. Patent     Dec. 8, 1981     4,304,160
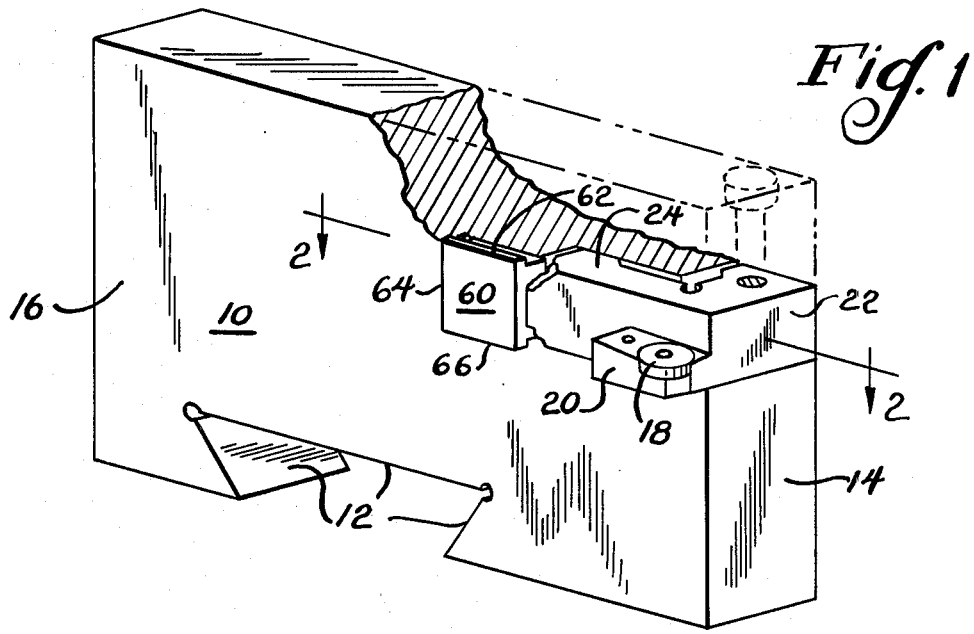
Fig. 1
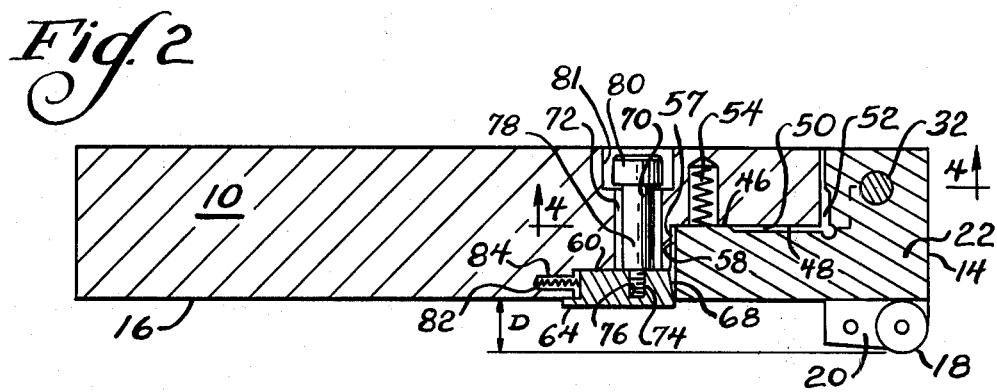
Fig. 2
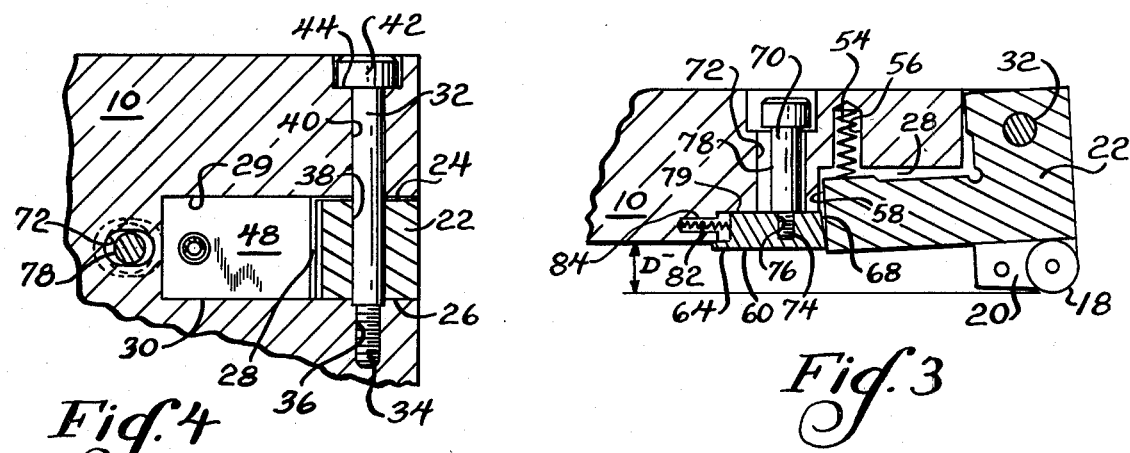
Fig. 4
Fig. 3

NO RETURN MARK TOOL

BACKGROUND OF THE INVENTION

This invention relates to no-return-mark turning, boring or facing tools which are used in conjunction with turning equipment, and more particularly to a method of preventing chips created during the operation of the tool from lodging between the moving parts of such a tool.

A smooth finished surface is needed for components in many mechanisms, for example, discs for automobile brakes. Prior to the advent of no-return-mark tools, the facing of a disc required adjusting the tool to the proper depth of cut before the disc was machined and, after completion of the cutting stroke, laterally moving the cutting edge off the finished surface so that the tool, as it was withdrawn, did not cut a return mark into the otherwise smooth surface.

The no-return-mark tool arose from the desire to eliminate, particularly in high output repetitive manufacturing processes, additional lateral motion of the cutting tools in order to prevent leaving a return mark on the finished surface of the machined piece when the cutting tool is withdrawn. Typically, a no-return-mark tool has a spring-loaded, pivoting cutting edge. As the cutting tool is fed into the work, the cutting pressure overcomes the spring force and allows the cutting edge to pivot and bottom-out against a hardened surface on the tool holder, the cutting edge remaining in this position as long as it is engaged in the cut. As the withdrawal stroke starts the cutting pressure is removed and the spring force pivots the cutting edge away from the finished surface. The tool can thus be withdrawn, leaving no return mark on the finished surface, without lateral movement of the tool setting.

The utility of no-return-mark tools is limited, however, because it is common for chips or metal fragments to become lodged between the moving parts of the tool, preventing the cutting tool from properly pivoting between its cutting and return settings.

It is the object of this invention to provide a no-return-mark tool with a means of preventing chips and other debris from lodging between the moving parts of the tool.

SUMMARY OF THE INVENTION

In general, the object of the present invention is met by having a spring actuated, slidable cover which shields the only gap between the pivoting member which supports the cutting edge and a second member which supports the pivoting member and is affixed to a mechanism which advances and withdraws the tool during its operation. Because the cover is spring actuated, it continually abuts the pivoting member during the latter's entire range of motion, thus substantially covering any gap between the pivoting member and its support member. With the gap covered, the likelihood of chips, metal fragments, and other debris lodging between the moving parts of the cutting tool is greatly reduced particularly since the tool shank is otherwise encased within a massive block-like tool holder in a manner preventing ingress of any foreign material which otherwise might interfere with the pivoting motion.

BRIEF DESCRIPTION OF THE DRAWINGS

FIG. 1 is a perspective view of the preferred embodiment of the no-return-mark tool with portions broken away to show internal structure;

FIG. 2 is a fragmentary horizontal sectional view of the no-return-mark tool in position to be engaged in a cutting stroke, taken substantially along line 2—2 of FIG. 1;

FIG. 3 is a fragmentary sectional view similar to FIG. 2 of the no-return-mark tool with the parts in relative position during its return stroke; and FIG. 4 is a fragmentary upright sectional view of the no-return-mark tool taken substantially along line 4—4 of FIG. 2.

DESCRIPTION OF THE PREFERRED EMBODIMENT

Referring to FIG. 1, the tool holder 10 consists of a massive block of metal. The tool holder 10 has a three-sided receiving slot 12 which enables the tool holder 10 to be mounted on the tool slide of "Automatic Chuckers and Bar Machines, Turret Lathes, Engine Lathes and Various Types of Turning Equipment", not shown. Once mounted, the tool holder 10 is moved in one linear directional path to advance and retract the entire holder with the front surface 14 leading in advance alongside the machined piece so that the large holder block surface 16 of the tool holder 10 is generally parallel to the machined piece. The tool holder 10 shown in the drawings is used for facing the lefthand side of the pieces and may be used in tandem with a similar right-handed cutting tool, not shown, such right-handed tool having a mirrored reversal of parts from the left-handed tool shown. When used in tandem, the tools can finish the face on both sides of a piece, a typical example being the discs in disc brakes as used in automobiles. The cutting tools would normally be used in such manner as production tools, the above described arrangement providing speed in the repetitive machining of such pieces.

The cutting tool 18 is a ceramic cutter on a seat 20 which is mounted on an L-shaped tool shank 22. As shown in FIG. 4, the top surface 24 and bottom surface 26 of the tool shank 22 are each accurately formed to fit in a receiving slot 28 in the tool holder 10. The upper surface 29 and lower surface 30 of the receiving slot 28 and tool shank 22 are finished to a close tolerance to be in sliding, non-binding contact with each other.

The tool shank 22 and tool holder 10 are mounted together by means of a machine screw 32. The machine screw has threads 34 on its lower end which screw into a bore 36 in the tool holder 10. That portion of the machine screw 32 which passes through bores 38 and 40 respectively in the tool shank and tool base is accurately formed with a smooth surface. The machine screw 32 is tightened into this position so that the bottom of the machine screw head 42 is tightened down onto the bottom surface of the countersink 44 in the tool holder 10.

The machine screw 32 serves as the pivot point for slight rotation of the tool shank 22. As shown in FIG. 2, the inner rear surface 46 of the tool shank 22 is precisely aligned against the adjacent surface 48 on the tool holder 10. These two surfaces are accurately formed so as to fit snugly against one another. Small gaps 50 and 52 may be permitted so as to require precise alignment of only the smaller inner rear surface 46.

When the cutting apparatus is at rest, the tool shank 22 is slightly rotated around the machine screw 32 by means of a spring 54 in a bore 56 in the tool holder 10, as shown in FIG. 3. When the cutting cycle begins, the tool holder 10 is advanced, its front surface 14 leading, until the cutting tool 18 engages the piece to be machined. The force applied to the cutting tool 18 by the piece to be machined will overcome the spring 54 and slightly rotate the tool shank 22 until surfaces 46 and 48 are in contact as shown in FIG. 2. While these surfaces are in contact, the outer edge of the cutting tool 18 will be a distance D away from large holder block surface 16 on the tool holder 10.

The tool shank 22 will remain in the FIG. 2 position until the cutting cycle ends, at which time the cutting tool 18 will no longer be in contact with the machined piece, and therefore spring 54 will again cause rotation of the tool shank 22 and the apparatus will return to the configuration as shown in FIG. 3. In this setting, the outer edge of the cutting tool is at a distance of D— from large holder block surface 16, this distance being less by a few thousandths of an inch than the distance D during the cutting cycle. The apparatus may then be withdrawn along the same linear path as it followed during the cutting cycle, and there will be no danger of the cutting tool 18 accidentally touching the machined piece and thereby leaving a mark since the cutting tool 18 has withdrawn a distance away from the machined piece, that distance being equal to the difference between the distances D and D—.

As shown in FIG. 2, slot 57 must necessarily be left between the end surface 58 of the tool shank 22 and the tool holder 10 to permit rotation of the tool shank 22 around the machine screw 32. In the past, operation of no-return-mark tools has been hindered by chips and metal fragments entering clearances and thereby interfering with the free movement of the tool. This problem is avoided in the present invention by use of a shield 60. This shield consists of a metal block which fits into a recess in the tool holder 10 and contains flanges 62, 64 and 66 on the top, rear and bottom respectively. These flanges engage the large holder block surface 16 of the tool holder 10, closing the recess and preventing chips and metal fragments from locating between the shield 60 and the tool holder 10 in such a way as would interfere with the free movement of the tool shank 22. The front surface 68 of the shield 60 is machined at an angle so that a minimal area fits snugly against the end surface 58 of the tool shank 22 at all times.

The shield 60 is slidably mounted to the tool holder 10 by means of a machine screw 70 extending through a generally oblong-shaped bore 72 in the tool holder 10. Threads 74 of the machine screw 70 screw into bore 76 in the shield 60. The threads 74 are smaller in diameter than the shaft 78 of the machine screw 70 so as to provide a shoulder at the base of the threads 74. The machine screw 70 may be firmly attached to the shield 60 by screwing in threads 74 until the shoulder on the larger shaft 78 is wedged against the rear surface 79 of the shield 60. The machine screw shaft 78 is smooth and can slide horizontally within the generally oblong-shaped bore 72. Screw head 80 is mounted in an enlargement 81 at the outer end of bore 72 and prevents the shield 60 from moving bodily away from the large holder block surface 16.

Movement of the shield 60 toward the tool shank 22 is accomplished by a light compression spring 82 in a bore 84 in the tool holder 10. The light spring 82 constantly urges the shield 60 against the end surface 58 of the tool shank 22, however, the spring 82 should not be and is not strong enough to prevent the rotation of the tool shank 22. As shown in FIG. 2, during the cutting cycle, the shield 60 abuts the end surface 58 of tool shank 22 so as to prevent cuttings or metal fragments from getting into gap 57.

I claim:

1. In a tool for use in a lathe-type turning machine tool, means for mounting a facing cutting element for automatic motion away from a faced surface upon completion of a facing cut so as to avoid marking such surface during tool withdrawal, comprising:

a tool holder block having upright exterior surfaces and containing a receiving slot for a tool holder shank extending through said surfaces;

a tool shank having upright longitudinally extending surfaces and means for supporting a cutting element extending outwardly from its upright longitudinal surfaces;

means pivotably mounting said tool shank in said receiving slot of said holder so that the exposed upright surfaces of said tool shank are substantially coplanar with the exterior upright surfaces of said holder, said shank having upper and lower surfaces in non-binding contact with upper and lower surfaces of said receiving slot, and means forming a slight space between the rear of said tool shank and the holder providing clearance for said pivoting of said tool shank;

means urging said tool shank about its pivotal mounting in said holder in a direction causing rotation of said tool shank to move the cutting tool toward the holder, said means being strong enough to cause such pivoting only when force is not applied to said cutting tool;

a shield block slidably mounted to said holder behind said tool shank;

means constantly urging said shield into face abutment with said end of said tool shank to close said clearance between said holder and said tool shank when said shank is pivoted into its cutting position.

2. The tool of claim 1, wherein said shield is mounted in a second receiving slot in said holder by means of a machine screw extending through a substantially oblong bore in said holder, the threads of said screw being slidably engaged with said holder and sized to prevent said head from being drawn through said oblong bore.

3. The tool of claim 2, wherein said shield has flanges covering the clearances between said shield and said holder.

4. A no-return-mark tool, comprising:

a tool holder block with means for securely mounting same on a tool slide, said block having a slot opening to a front face of the block;

a tool shank, having a portion for holding a cutting tool exteriorly of the tool holder block, said tool shank being pivotally mounted in said slot in said tool holder and having both a top and bottom surface in non-binding contact with the tool holder within said slot and with a slight gap between a rear surface of said tool shank and the tool holder slot, so as to permit limited rotation of said tool shank about said pivotal mounting;

spring means urging the tool shank about its pivotal mounting in said tool holder in a direction causing rotation of said tool shank moving the cutting tool toward the holder, said spring being strong enough to separate said parts only at the end of a cutting cycle when force is no longer applied to said cutting tool;

a shield slidably mounted to the tool holder in alignment with said slight gap and means constantly urging said shield into face abutment with said end of said tool shank to close said slight gap when the cutting tool and its shank are pivoted in a direction away from the tool holder, said shield thereby preventing metal fragments from entering between said tool shank and tool holder.

5. In a no-return-mark tool having:

a tool holder block having means for mounting to a linear motion tool carrier of a machine tool of the type turning a work piece against a facing tool and a facing tool shank pivotally mounted to the block and carrying a cutting member beside the block in position to face a work piece surface during motion in one direction along said linear motion tool slide movement and to pivot away from the work piece during motion in an opposite direction along said linear motion, means preventing ingress of chips and the like interfering with said pivoting of the tool shank relative to said holder block, comprising:

generally horizontal walls forming upper and lower extremities of a slot in said block opening toward the work piece when the block is mounted to the tool carrier and an upright wall joining the horizontal walls forming the rear extremity of said slot;

a tool shank filling the slot between the upper and lower walls with close tolerances preventing ingress of chips there between, said shank being pivoted on an upright axis, said shank having a rear portion spaced from said upright wall to provide clearance for said pivoting;

a shield block overlying said clearance and mounted on said block for limited motion in said linear motion direction, said shield block having a surface abutting said tool holder to close said clearance, and means constantly urging said shield block against the tool shank with a force insufficient to interfere with pivoting of the tool shank relative to the holder block.

6. A no-return-mark tool useable in a rotating work piece machine tool, comprising:

a tool holder block mountable upon a tool slide for straight line motion in advance and retraction movement beside a work piece;

means in the block forming a tool shank receiving slot opening to the work piece side thereof with horizontal top and bottom surfaces and a rear upright surface;

a tool shank pivotally mounted in said block slot and filling the slot between said top and bottom surfaces and having a clearance space with said rear surface, said shank having a cutting member support outboard of the holder for pivoting movement with the shank to carry said member away from the work piece during retraction so as to avoid marking a faced surface during such retraction;

means for preventing ingress of chips and the like into said holder block slot interfering with said shank pivoting movement including a shield block slidably mounted on said holder block over said clearance space at the rear surface of said holder slot; and means urging said shield block into engagement with said shank, said block having a face mating a face of said shank to close said clearance on the side of the holder adjacent the work piece.

7. A no-return-mark tool for use in a machine tool having means to rotate a work piece against the tool, comprising:

an upright tool holder block having means for securely mounting same to a machine tool slide for movement longitudinally toward and away from a work piece rotation axis;

means forming a generally horizontally extending tool shank receiving slot in said block opening to at least one side thereof;

a tool shank filling said receiving slot from top to bottom, pivot means securing said shank within said holder slot for limited pivotal movement therein, said shank carrying a cutting means exteriorly of the block so that said pivoting movement of the shank can move the cutting means away from the block during a facing advance motion and toward the block during a withdrawal motion of the tool holder relative to the work piece;

said holder slot and tool shank being proportioned to provide clearance for said pivotal movement and means for shielding said clearance from ingress of chips and the like which may interfere with such pivotal movement including a slidably mounted shield block in said tool holder in alignment with said slot and tool shank and of a size to close said clearance, means urging said shield block into constant contact with said tool shank with a force smaller than forces pivoting said tool shank, said shield following said tool holder movement to close said clearance at all times.

8. A no-return-mark metal tool holder comprising:

a tool holder block having means for mounting same to a machine tool slide, said block having a groove therein with substantially parallel upper and lower surfaces for receiving the shank of a cutting tool;

a cutting tool shank within said holder groove and having upper and lower surfaces in sliding non-binding contact with said groove surfaces;

means mounting said tool shank for limited pivotal movement in said slot between a working position and a retraction position with said pivot being located to move a cutting surface on said shank through an arc toward and away from a work piece;

spring means urging said shank toward said retraction position; and means for sealing space between said shank and holder block slot through which said shank pivots including a cover block having one face abutting said shank and flanges overlying said block about said groove, means urging said lower block toward said shank, movement of said shank to working position overcoming said urging means and bringing said one face into full abutment with the shank leaving no space for ingress of chips, dirt, debris and the like into said holder groove to interfere with proper pivoting of said tool shank.

* * * * *